(12) United States Patent
Heikkilä et al.

(10) Patent No.: US 6,239,274 B1
(45) Date of Patent: May 29, 2001

(54) METHOD OF PRODUCING XYLOSE

(75) Inventors: Heikki Heikkilä; Jarmo Kuisma, both of Espoo; Mirja Lindroos, Kirkkonummi; Outi Puuppo, Espoo; Olli-Pekka Eroma, Kotka, all of (FI)

(73) Assignee: Xyrofin Oy, Helsinki (FI)

( * ) Notice: Subject to any disclaimer, the term of this patent is extended or adjusted under 35 U.S.C. 154(b) by 0 days.

(21) Appl. No.: 09/369,702

(22) Filed: Aug. 6, 1999

Related U.S. Application Data

(63) Continuation of application No. PCT/FI98/01013, filed on Dec. 22, 1998.

(30) Foreign Application Priority Data

Dec. 23, 1997 (FI) .......................................... 974625

(51) Int. Cl.⁷ ................................ C07H 1/08; C07H 1/06
(52) U.S. Cl. .......................................... 536/128; 536/127
(58) Field of Search .................................. 536/124, 127, 536/128

(56) References Cited

U.S. PATENT DOCUMENTS

| | | | | |
|---|---|---|---|---|
| 4,008,285 | * | 2/1977 | Melaja et al. | 260/635 |
| 4,075,406 | * | 2/1978 | Melaja et al. | 536/1 |
| 4,631,219 | | 12/1986 | Heikkila | 210/635 |
| 5,084,104 | * | 1/1992 | Heikkila et al. | 127/46.2 |
| 5,637,225 | * | 6/1997 | Heikkila et al. | 210/659 |
| 5,730,877 | * | 3/1998 | Heikkila et al. | 210/659 |

FOREIGN PATENT DOCUMENTS

| | | | |
|---|---|---|---|
| 534 210 | * | 4/1973 | (CH) . |
| 1929268 | * | 2/1969 | (DE) . |
| 1384170 | | 2/1975 | (GB) . |
| WO 94/26380 | | 11/1994 | (WO) . |
| WO 96/27028 | | 9/1996 | (WO) . |
| 97/49659 | * | 12/1997 | (WO) . |

OTHER PUBLICATIONS

Rydholm, Sven A., Pulping Processes, 1965, Interscience Publishers, a division of John Wiley & Sons, Inc., p. 519.

Rydholm, Sven A., Pulping Processes, 1965, Interscience Publishers, a division of John Wiley & Sons, Inc., p. 455–459.

Pettersson et al. "Uronic acids in spent sulfite liquid from spruce", Sven. Papperstidn., vol. 70(15): 462–468, 1967.*

Kryukova et al. "Determination of the carbohydrate composition of bisulfite liquor", Tsellyul., Bum. Karton, vol. 15: 12–13, 1978.*

* cited by examiner

*Primary Examiner*—Howard C. Lee
(74) *Attorney, Agent, or Firm*—Scully, Scott, Murphy & Presser

(57) ABSTRACT

The present invention relates to a method of producing xylose by chromatographic separation of the xylose from a sulphite cooking liquor containing for example xylose and xylonic acid. The xylose yield of the separation is affected by the xylonic acid and xylose content in the cooking liquor used in the separation and the amount of base cation used in the sulphite cooking.

25 Claims, No Drawings

METHOD OF PRODUCING XYLOSE

CROSS REFERENCE TO RELATED APPLICATIONS

This application is a continuation of International application No. PCT/FI98/01013, filed Dec. 22, 1998.

The present invention relates to a method of producing xylose by chromatographic separation of the xylose from a sulphite cooking liquor containing for example xylose and xylonic acid and having lignosulphates as its main components. It is known to use xylose as a raw material in e.g. xylitol, aromatic products and animal feed.

Xylitol is a sugar alcohol occurring in nature and having a sweetness corresponding to that of "ordinary sugar", but a calorie content (2.4 kcal/g) lower than that of ordinary sugar. Small amounts of xylitol occur in many fruits and vegetables, and it is even produced by the human body as a normal metabolic product. Certain metabolic, odontological and technical properties of xylitol make it an extremely good special sweetener for various uses, such as chewing gum and candy. An example is the independence of xylitol metabolism of insulin metabolism, allowing xylitol to be used by diabetics, too. Xylitol also has a slowing intestinal effect, making it usable in slimming diets. Furthermore, xylitol has been proved to be noncariogenic, even anticariogenic.

The recognized advantageous properties of xylitol have increased its demand recently, resulting in an increased need for an inexpensive and suitable raw material for the production of xylitol.

Previously xylitol was produced mainly by hydrolyzing xylan-containing materials. This way a monosaccharide mixture, containing for example xylose, is obtained. After different purification stages the xylose is then reduced into xylitol by catalytic reduction (hydrogenation), usually in the presence of a nickel catalyst, such as Raney nickel. The literature of the field describes numerous methods of producing xylose and/or xylitol from xylan-containing materials. As examples can be mentioned U.S. Pat. No. 3,784,408 (Jaffe et al.), U.S. Pat. No. 4,066,711 (Melaja et al.), U.S. Pat. No. 4,075,406 (Melaja et al.), U.S. Pat. No. 4,008,285 (Melaja et al.), and U.S. Pat. No. 3,586,537 (Steiner et al.).

In several plants the majority of hemicellulose is xylan which can be hydrolyzed into xylose. Particularly the hemicellulose of hardwood is rich in xylan. Consequently it is possible to obtain xylan and xylose as by-products from cellulose industry using hardwood, the utilization of which has been previously suggested in e.g. Finnish Pat. 55,516 and U.S. Pat. application 60/049,065.

Xylan, the hemicellulose used as raw material in xylose production, occurs particularly in acid hardwood sulphite cookings mainly as monomers, in which cookings $Mg^{2+}$, $Ca^{2+}$, $NH_4^+$ and $Na^+$ are typically used as the base. The concept "cooking liquor" refers herein to the solution used in the cooking or obtained after the cooking, or to a part thereof (e.g. what is known as side removal or a cooking liquor from multi-stage cooking). Besides hardwood, other xylan-containing biomass, such as straw or bagasse, can also be used as raw material in sulphite cookings.

When using sulphite cooking liquor as a raw material of xylose, the problem is the varying amount of xylose in the cooking liquor, due to e.g. different wood hemicellulose compositions and hemicellulose reactions during cooking. Consequently, in addition to xylose and components dissolved from wood, sulphite cooking liquors contain for example xylonic acid, occurring in acid conditions mainly as lactone. The xylonic acid in the liquor complicates in itself xylose separation by reducing the xylose content in the cooking liquor and the xylose yield from the cooking liquor. This again reduces for example the xylose crystallization yield from a xylonic acid-containing xylose concentrate, a problem dealt with in pending PCT Patent Applications PCT/FI97/00402 and PCT/FI97/00403.

It has now been observed that as the amount of xylonic acid in the cooking liquor increases, the amount of xylose in the liquor diminishes. In other words, the xylose yield is the better the less xylonic acid is present in the liquor. In addition to said xylonic acid and xylose, the cooking liquors of acid sulphite cookings also contain degradation products of xylose and other saccharides, the amounts of which are affected by cooking conditions, such as cooking time and cooking temperature. Furthermore, part of the potentially obtainable xylan/xylose remains in the wood.

As presented above, cations $Mg^{2+}$, $Ca^{2+}$, $NH_4^+$ and $Na^+$ are used as base in sulphite cookings and all of these can be used in acid cookings. $NH_4^+$ and $Na^+$ cations can also be used in neutral and even basic conditions. The cations most commonly used in acid sulphite cookings are $Ca^{2+}$ and $Mg^{2+}$. With stricter environmental norms, $Mg^{2+}$ cooking is becoming more common, since $Mg^{2+}$ can be recycled by evaporation and burning the cooking liquor after cooking and by recovering the Mg as MgO. Sulphur is recovered simultaneously. there is no corresponding economic recycling method for $Ca^{2+}$. On the other hand, the use of $Mg^{2+}$ base enables a somewhat higher pH in cooking, which is advantageous as regards the production of chemical pulp. However, it has now been noted that as a result of a higher pH, less xylose is formed in the cooking liquor.

The xylose content in $Ca^{2+}$ and $Mg^{2+}$ cooking liquors has been analyzed to be even less than 10% of the dry solids in the cooking liquor, the theoretical amount being as much as over 20% of dry solids, Factors directly affecting the xylose content of the cooking liquor include the tree species and the quality of wood used in the cook and its hemicellulose composition. Usable tree species include birch, beech, aspen, maple, elm, rowan, eucalyptus and acacia. Birch and beech are known to be particularly good xylose raw materials, birch being especially advantageous in this respect. If the wood raw material is pure birch, even over 20% xylose contents have been measured from the dry solids of the cooking liquor. However, in practice the raw material used in hardwood pulp is often mixed hardwood formed of various hardwood species, resulting in a varying amount of xylose in the cooking liquor with a content of even less than 10%. However, pulp producers do not usually select the raw wood material mainly based on the xylose content of the cooking liquor, but instead the decision is naturally affected by other factors related to the production of pulp, such as availability of raw wood material, its price, and the quality and price of the pulp to be produced. Other factors affecting the xylose content include cooking time and cooking temperature and the total amount of $SO_2$ used. All these factors also affect the quality of the produced pulp. Acid sulphite cookings are used to produce paper pulp and special pulp, such as dissolving pulp.

Chromatographic separation of xylose is described in e.g. the above PCT Patent applications PCT/FI97/00402 and PCT/FI97/00403 and U.S. Pat. No. 4,631,129. Chrorriatographic separation of pure xylose from a cooking liquor rich in xylonic acid is difficult, for example because xylonic acid is not easily separated from xylose. In chromatographic separation, organic carboxylic acids, such as xylonic acid in the cooking liquor, are eluted below their dissociation pH as uncharged substances. Elution order is affected by e.g. molecular size, i.e. acids with larger molecular size are eluted first. The molecular sizes of xylonic acid and xylose are substantially identical. Consequently, xylonic acid is eluted from the column at roughly the same time as xylose, or somewhat later, (as lactone), whereby the purity of the xylose fraction is not high. When pH is raised over the dissociation pH, the acids are dissociated, while xylonic acid lactone is also partially split. If the separation resin in the column is in a monovalent ($Na^+$, $K^+$) resin form, the dissociated acids or their salts would be eluted at the beginning of the separation profile, before xylose. When resin is used in a divalent form, acids and their salts are, however, more strongly retained, particularly at an elevated pH, as they form complexes with the divalent ions ($Ca^{2+}$, $Mg^{2+}$) of the resin. This means that the acids and salts are elute almost simultaneously with the xylose, causing low purity of the xylose fraction, or even later. When a higher pH is used, the purity of the xylose fraction can be increased since part of the acids and salts are eluted after the xylose. The use of resin in $Na^+$ form would contribute to achieving a pure product, but in practice the base exchange is not often possible because of e.g. cost, since it would increase the use of chemicals. This again would result in an increase of waste chemicals. An example of a risk to be avoided is for sodium to end up in the magnesium recovery process, since it would hamper the recovery of magnesium. A strongly acid cation exchange resin can preferably be used in chromatographic separation. An advantageous way is to use strongly acid resin in the base form of the cooking.

A high xylose content can in principle be achieved in acid prehydrolysis of hardwood, but after such a procedure the production of pulp is difficult and this procedure is therefore not really feasible especially when sulphite cooking is used.

Since the xylose amount in sulphite cooking liquors is in practice often low and variable, and the amount of xylonic acid again relatively high, making the separation of pure xylose from the cooking liquor difficult, attempts to find ways to enhance the chromatographic separation of xylose have been made.

The object of the present invention is large-scale production of xylose, to be used as raw material e.g. in xylitol production, from sulphite cooking liquors by enhancing the chromatographic separation of xylose in order to obtain purer xylose with higher yield from the raw material to be processed.

A further object of the invention is the chromatographic separation of xylose from cooking liquor so as to enable the cooking liquor to be normally recycled after xylose separation to the recovery process of cooking chemicals. It is an additional advantage of the invention to provide xylose fraction to xylose crystallization. It is a further advantage of the present invention to perform the separation in such a way that no foreign chemicals complicating the recovery of chemicals have to be added to the cooking liquor.

Above-mentioned objects are achieved according to the invention by (1) sulphite cooking the xylan-containing raw material in the presence of base; and (2) subjecting said sulphite cooking liquor to a chromatographic separation.

It has been round that the chromatographic separation of xylose from sulphite cooking liquor, i.e. the material processed, is enhanced considerably when the relative proportion of xylose in the sulphite cooking liquor is increased and the amount of xylonic acid disturbing the separation is decreased. It is known per se that the cooking temperature and the cooking time and the total $SO_2$ content affect the composition of the cooking liquor. It has been observed that, in accordance with the present invention, the xylose amount in the sulphite cooking liquor can be increased by adjusting the content of base in the cooking.

The method of the invention is consequently characterized by what is stated in claims 1 and 2. Additionally the invention concerns methods of producing xylose from xylan-containing raw material, by (1) sulphite cooking the xylan-containing raw material in the presence of base to produce a sulphite cooking liquor containing xylose and xylonic acid, and (2) subjecting said sulphite cooking liquor to a chromatographic separation to produce a xylose enriched fraction, which methods are characterized in that the amount of base used in step (1) is either low or reduced so as to increase the ratio of xylose to xylonic acid in the sulphite cooking liquor and to increase the xylose content in the xylose enriched fraction in step (2).

Chromatographic separation may be carried out by the batch or simulated moving bed method (SMB method), the latter being currently commonly used. The SMB method enables a higher separation capacity and the need to use eluent is considerably smaller than when using the batch method. The simulated moving bed method is described in e.g. the applicant's previous patent applications, EP-94905112.2 and PCT/FI95/00224, and U.S. Pat. No. 5,637,225.

In the methods of the present invention, the xylan-containing raw material can be hardwood, such as birch, beech, aspen or eucalyptus. Besides hardwood, other xylan-containing biomass, such as straw or bagasse can be used as raw material in sulphite cookings.

The material to be processed in the invention and from which xylose is separated, i.e. what is known as sulphite cooking liquor, is particularly an acid sulphite cooking liquor. In acid sulphite cooking liquors cations, such as $Mg^{2+}$, $Ca^{2+}$, $NH_4^+$ and $Na^+$ are typically used as bases. Preferably cations $Ca^{2+}$ and $Mg^{2+}$ are used as bases as described above.

The pH of acid cooking liquors is usually in the range of about 1 to 3. Adjustment of the pH of divalent ($Ca^{2+}$, $Mg^{2+}$) sulphite cooking liquors has been put forward as an improvement for xylose yield, but xylose separation has not been significantly improved by adjusting the pH of the cooking liquors. In contrast, in monovalent ($Na^+$, $NH_4^+$) sulphite cooking liquors, the pH of the cooking liquor can considerably affect xylose separation. Reference is made to e.g. patent applications PCT/FI97/00402 and PCT/FI97/00403. It has been found that base is preferably only used to the degree that proper sulphite cooking, recycling of cooking chemicals, and the desired high quality for the pulp are ensured by the methods in use.

Acid sulphite cooking liquor contains sulphite and bisulphite ions and in excess of sulphur dioxide $SO_2$. When referring to sulphite cookings, the term total $SO_2$ is used and it is formed of free sulphur dioxide and combined sulphur dioxide. Free sulphur dioxide contains the non-combined $SO_2$ and half of the sulphur dioxide considered to be combined as bisulphite. Thus it indicates the part of the total $SO_2$ present in the cooking liquor in addition to the $SO_2$ required for the formation of monosulphite. This definition is presented for example in the publication *Puumassan valmistus* [production of wood pulp], Suomen Paperi-insinöörien Yhdistyksen oppi-ja käsikirja II, part 1, edited by Nils-Erik Virkola, 2. Edition, Turun Sanomat Oy/Serioffset, Turku 1983. Sulphur dioxide is partially liberated during and after cooking and according to normal practice, the remaining sulphur is recovered in the chemical process as $SO_2$. The use of a smaller amount of base also reduces its recycling. With a smaller base amount, the amount of the neutralized $SO_2$ in the solution is smaller, free $SO_2$ being liberated more during the cooking process or thereafter. In order to minimize environmental odour and other drawbacks and maintain cooking chemical economy, the recovery and recycling of the liberated $SO_2$ has to be done with methods according to prior art.

The amount of base in the cooking liquor is reduced by the sulphur dioxide liberated from the cooking liquor not being led to the chemical recovery process, but instead it is recycled to cooking acid preparation and further to cooking liquor. In this way the amount of total $SO_2$ in the cooking liquor can be kept constant or its amount can even be increased, increasing the recyclable free $SO_2$. In addition to the desired increase in xylose content, such a process reduces chemical processing costs, does not increase environmental burden, or hamper the actual pulp production process, but instead may even accelerate the cooking.

The amount of base in the cooking liquor can also be affected by the liquid/wood ratio (calculated from the dry solids of wood) of the cooking. According to the present invention it has specially been observed that the lower the amount of base (the base/wood ratio, preferably the $Mg^{2+}$/wood ratio or the $Ca^{2+}$/wood ratio), the higher the xylose content of the liquor to be separated, and correspondingly, the lower the xylonic acid content.

Suitably, in the chromatographic separation is used a cooking liquor from sulphite cooking with a base content of less than about 1.0 mol/kg wood, preferably less than about 0.7 mol/wood, calculated from dry solids.

Usually the xylonic acid content of the sulphite cooking liquor used in the chromatographic separation is low. Said xylonic acid content can be less than 10%, preferably it is less than 7%, and most preferably it is less than 5%. On the other hand, the xylose content of said cooking liquor is usually more than 10%, preferably more than 15%, and most preferably more than 20%.

By reducing the amount of base in the sulphite cooking liquor according to the present invention, the portion of xylonic acid in the cooking liquor can be reduced, and correspondingly, the portion of xylose increased, by several percents. Reducing the amount of xylonic acid, which disturbs chromatographic separation, in the raw material solution to be processed, significantly facilitates the chromatographic separation of xylose, whereby a significantly purer product with a higher yield is achieved than previously. This leads further to a significantly higher xylose yield in the xylose recovery process, e.g. crystallization.

Chromatographic separation of xylose from the solution to be processed in step (2), i.e. in this case sulphite cooking liquor, is implemented by the batch, or preferably, by the simulated moving bed method, described e.g. in the above mentioned U.S. Pat. No. 5,637,225 and PCT published application The resin used in the chromatographic separation is suitably a strongly acid cation exchange resin, preferably a resin with a polystyrene/divinyl benzene backbone.

The ion form of the resin used in the chromatographic separation is usually equilibrated to substantially the same form as the base used in the sulphite cooking. Preferably the ion form of the resin is the $Ca^{2+}$ or $Mg^{2+}$ form.

In the chromalographic separation water is used as eluent, and the xylose fraction is recovered.

For the preparation of xylitol, xylose can be crystallized and processed further in manners known per se and described e.g. in the applicant's previous PCT Application PCT/FI95/00327.

The following examples illustrate the invention, but it is apparent that they are not to restrict the invention.

EXAMPLE 1

Two sulphite cookings (tests 1 and 2) were carried out by cooking 4 kg birch chips (dry solids) in a forced circulation cellulose digester by using an $Mg^{2+}$ base as the base. In both tests the temperature was raised within one hour to 115° C. and then during 2.5 hours to 148° C., at which temperature the cooking time was 4 hours 15 minutes. Table 1 shows the cooking conditions, liquid/wood ratio, base content, base/wood ratio (mol/kg) and total sulphuric dioxide content, and Table 2 shows the magnitudes measured from the cooking liquor, and the analysis results.

Of the magnitudes in the Tables of the examples, the liquid/wood and the base/wood ratio have been calculated per dry wood. The contents of the bases ($Ca^{2+}$ and $Mg^{2+}$) were analyzed by atomic absorption spectrophotometry. In Tables 1, 3, 5 and 7, total $SO_2$ has been shown by dosage. Further, the Tables of the examples show cooking liquor dry solids contents, determined by Karl Fischer titration, pH, and carbohydrate contents analyzed from the cooking liquors (HPLC, column filled with a cation exchange resin in $Na^+$ or $Pb^{2+}$ form to determine, respectively, oligosaccharides and monosaccharides), and xylonic acid content (HPLC, anion exchange resin, PED detector). The contents were determined from dry solids.

TABLE 1

Cooking conditions in tests 1 and 2

|  | Test 1 | Test 2 |
| --- | --- | --- |
| Liquid/wood ratio (l/kg) | 3.7 | 3.7 |
| $Mg^{2+}$ content (g/l) | 8.5 | 7.0 |
| $Mg^{2+}$/wood ratio (mol/kg) | 1.29 | 1.07 |
| Total $SO_2$ (g/l) | 47.5 | 47.5 |

TABLE 2

Cooking liquor analysis results for tests 1 and 2

|  | Test 1 | Test 2 |
| --- | --- | --- |
| Dry solids content (g/100 g) | 17.3 | 18.4 |
| pH | 1.2 | 1.1 |
| Neutr. Oligosaccharides (w-%) | 0.3 | 2.9 |
| Glucose (w-%) | 1.5 | 3.2 |
| Galactose + rhamnose (w-%) | 0.9 | 1.0 |
| Arabinose + mannose (w-%) | 1.4 | 1.6 |
| Xylose (w-%) | 14.7 | 15.0 |
| Xylonic acid (w-%) | 7.6 | 5.6 |

EXAMPLE 2

A $Ca^{2+}$ sulphite cooking was carried out (test 3) by cooking 3 kg birch chips (dry solids) in a forced circulation cellulose digester. The temperature was raised to 115° C. during 55 minutes, and then to 148° C. in 2.5 hours, in which temperature cooking time was 2 hours 20 minutes. Table 3 shows magnitudes corresponding to those in Table 1, and Table 4 shows magnitudes corresponding to those in Table 2.

TABLE 3

Cooking conditions in cooking test 3

| | |
|---|---|
| Liquid/wood ratio (l/kg) | 3.7 |
| $Ca^{2+}$ content (g/l) | 11.5 |
| $Ca^{2+}$/wood ratio (mol/kg) | 1.06 |
| Total $SO_2$ (g/l) | 70 |

TABLE 4

Cooking liquor analysis results for test 3

| | |
|---|---|
| Dry solids content (g/100 g) | 17.3 |
| pH | 1.2 |
| Neutr. Oligosaccharides (w-%) | 1.4 |
| Glucose (w-%) | 1.7 |
| Galactose + rhamnose (w-%) | 1.1 |
| Arabinose + mannose (w-%) | 1.7 |
| Xylose (w-%) | 16.9 |
| Xylonic acid (w-%) | 5.9 |

EXAMPLE 3

A $Ca^{2+}$ sulphite cooking was carried out (test 4) by cooking birch chips in a forced circulation cellulose digester. The temperature was raised to 138° C. in 2 hours in which temperature cooking time was 2 h. Table 5 shows data on the cooking liquor corresponding to those in Table 1 and Table 6 shows data corresponding to those in Table 2.

TABLE 5

Cooking conditions in cooking test 4

| | |
|---|---|
| Liquid/wood ratio (l/kg) | 3.3 |
| $Ca^{2+}$ content (g/l) | 8.1 |
| $Ca^{2+}$/wood ratio (mol/kg) | 0.67 |
| Total $SO_2$ (g/l) | 70.0 |

TABLE 6

Cooking liquor analysis results for test 4

| | |
|---|---|
| Dry solids content (g/100 g) | 16.3 |
| pH | 1.7 |
| Neutr. Oligosaccharides (w-%) | 1.0 |
| Glucose (w-%) | 0.8 |
| Galactose + rhamnose (w-%) | 1.5 |
| Arabinose + mannose (w-%) | 1.2 |
| Xylose (w-%) | 20.5 |
| Xylonic acid (w-%) | 6.5 |

EXAMPLE 4

A $Ca^{2+}$ sulphite cooking was carried out (test 5) by cooking maple and elm chips in a forced circulation cellulose digester. The temperature was raised to 140° C. in 4 hours in which temperature the cooking time was 1 h. Table 7 shows data on the cooking liquor corresponding to those in Table 1 and Table 8 shows data corresponding to those in Table 2.

TABLE 7

Cooking conditions in cooking test 5

| | |
|---|---|
| Liquid/wood ratio (l/kg) | 3.6 |
| $Ca^{2+}$ content (g/l) | 8.1 |
| $Ca^{2+}$/wood ratio (mol/kg) | 0.73 |
| Total $SO_2$ (g/l) | 70.0 |

TABLE 8

Cooking liquor analysis results for test 5

| | |
|---|---|
| Dry solids content (g/100 g) | 13.3 |
| pH | 2.6 |
| Neutr. Oligosaccharides (w-%) | 0.7 |
| Glucose (w-%) | 1.0 |
| Galactose + rhamnose (w-%) | 1.5 |
| Arabinose + mannose (w-%) | 2.7 |
| Xylose (w-%) | 15.0 |
| Xylonic acid (w-%) | 7.1 |

EXAMPLE 5

In order to indicate the reverse effect of the xylonic acid and xylose contents of sulphite cooking liquor on the xylose separation performance of chromatographic separation, following two separation tests were performed: 33 w-% Mg cooking liquor having 6 kg dry solids was fed into a batch column (diameter 0.225 m, height 5.0 m), filled with strongly acidic cation exchange resin in $Mg^{2+}$ form (Finex CS 13 GC, average spherical bead size 0.4 mm). Water was used as eluent with a linear flow of 0.9 m/h at a temperature of 65° C. As feed solutions were used two different Mg cooking liquors, prepared by using different amounts of base in the cooking. Before the separation test, the resin was equilibrated by the cations of the cooking liquor.

Two product fractions and a recycle fraction, which was recycled, were recovered from the lower end of the column. The compositions of the product fractions were analyzed by HPLC. The fractions were collected and analyzed. Fractions were obtained which contained 44% xylose in the xylose fraction, and 2% xylose in the residue fraction. The xylose and xylonic acid contents of the feed solutions, xylose fractions and residue fractions are shown in Table 9.

TABLE 9

Xylose and xylonic acid contents of feed solutions, xylose fractions and residue fractions.

| | Feed solution/<br>% dry solids | Xylose fraction/<br>kg/feed | Residue fraction<br>kg/feed |
|---|---|---|---|
| separation 1 | | | |
| xylose | 11.6 | 0.33 | 0.07 |
| xylonic acid | 8.4 | 0.21 | 0.08 |
| separation 2 | | | |
| xylose | 15.9 | 0.47 | 0.10 |
| xylonic acid | 4.0 | 0.07 | 0.03 |

EXAMPLES 6A–6D

The test apparatus used for the SMB separation of xylose comprised five columns connected in series, feed pumps, circulating pumps (before each column), eluent water pumps, flow and pressure measurements and adjustments, and inlet and product valves for the different process streams. Each column consisted of one separate sectional packing material bed. The first three sectional packing material beds had a height of 3.6 m and the last two 4.6 m. The columns were packed with a strongly acid cation exchange resin (Finex CS 13 GC). The resin had a polystyrene/divinyl benzene backbone and was activated with sulphonic acid groups; the mean bead size being about 0.38 mm. The DVB content of the resin was 6.5%. Prior to the test the resin had been regenerated to magnesium form, and the resin was then equilibrated by sulphite cooking liquor. Water was used as eluent.

| Test conditions: | |
|---|---|
| Diameter of columns | 0.11 m |
| Total height of resin bed | 20.00 m |
| Temperature | 65° C. |
| Flow rate | 28 to 70 l/h |

Fractionation was performed by a thirteen-step sequence. The duration of the sequence vias 130 minutes, comprising the following steps:

Step 1: 8.1 l of feed solution was introduced (feeding phase) into column 1 at a flow rate 49 l/h, and a corresponding amount of xylose fraction was eluted from column 5 at a corresponding flow rate.

Step 2: 8.8 l of feed solution was introduced (feeding phase) into column 1 at a flow rate 45 l/h, and residue was eluted from column 2 at a corresponding flow rate. Water was supplied simultaneously to column 3 at a flow rate 54 l/h and 1.4 l xylose fraction was eluted from column 5 at a corresponding flow rate.

Step 3: With the previous feeding solution (feeding phase) still being introduced in step 2(8.8. l at a flow rate 54 l/h), 9.2 l recycle fraction was eluted simultaneously from column 5 at a flow rate 55 l/h, a corresponding amount of water being supplied to column 3 at a corresponding flow rate.

Step 4: Water was supplied to column 3 at a flow rate 38 l/h and 1.4 l of residue was eluted from column 2 at a corresponding flow rate.

Step 5: 11.3 l was recycled (recycling phase) in the loop formed by all five columns, at a rate 38 l/h.

Step 6: 15.5. l water was introduced into column 4 at a rate 66 l/h and simultaneously 9.2 l residue A was eluted from column 5 at a rate 38 l/h and 6.3 l residue B from column 3 at a flow rate 28 l/h.

Step 7: 14.1 l was recycled (recycling phase) in the loop formed by all five columns, at a rate 57 l/h.

Step 8: Water was introduced into column 5 at a flow rate 59 l/h and 11.1 l residue fraction was eluted from column 4 at a corresponding flow rate.

Step 9: 14.1 l was recycled (recycling phase) in the loop formed by all five columns, at a rate 63 l/h.

Step 10: Water was introduced into column 1 at a flow rate 63 l/h and 12 l residue was eluted from column 5 at a corresponding flow rate.

Step 11: 11.3 l was recycled (recycling phase) in the loop formed by all five columns, at a rate 66 l/h.

Step 12: Water was introduced into column 2 at a flow rate 66 l/h and 11.3 l residue was eluted from column 1 at a corresponding flow rate.

Step 13: 2.8 l was recycled (recycling phase) in the loop formed by all five columns, at a rate 70 l/h.

After the sequence was completed, the process control program was continued and it then returned to step 1. By repeating this sequence five to seven times the system was equilibrated. The method was proceeded with in a state of equilibrium, and the progress of the separation process was monitored with on-line instruments, i.e. a conductivity and density meter. The separation was controlled by a microprocessor whereby feed and eluent volumes, and recycled liquid and product fractions volumes were precisely defined by employing volume flow measuring, valves and pumps.

In this method, seven product fractions and one recycle fraction were withdrawn: a xylose fraction from column 5, six residue fractions, i.e. one residue fraction from columns 1 to 4, and two residue fractions from column 5. The recycle fraction was eluted from column 5.

By using the described separation method, four different raw materials (A to D) were subjected to separation. Table 10 shows the raw materials A to D subjected to separation. As recycle was employed a discharged recycle fraction which was combined to an incoming raw material using a reflux ratio by which an about 48% dry solids content was obtained for the feed solution introduced into separation. (The reflux ratio is the amount of dry solids in the recycle fraction divided by the amount of dry substance in the separated fractions. In feed A the reflux ratio was 18%, in feed B 18.5%, in feed C 19%, and in feed D 13.3%). The feed solutions of examples 6A and 6B in Table 10 were obtained from Mg sulphite cooking in such a way that feed solution 6A was obtained from Mg sulphite cooking, wherein the content of the base was lowered and wherein recycling from the cooking liquor liberated $SO_2$ to preparation of cooking acid. Feed solution 6B in turn is a liquor obtained from the cooking, with a larger amount of base. Feed solutions 6C and 6D were obtained from $Ca^{2+}$ birch sulphite cookings carried out by processes corresponding to those in examples 2 and 3 by using different base contents.

Analysis results, product yields, xylose and xylonic acid contents from xylose fractions are shown in Tables 11 to 14.

TABLE 10

Raw materials 6A to 6D

| | 6A | 6B | 6C | 6D |
|---|---|---|---|---|
| dry solids content (w-%) | 65.00 | 65.00 | 65.00 | 65.00 |
| xylose content (w-%)[1)] | 15.10 | 9.10 | 11.10 | 27.20 |
| xylonic acid content (w-%)[1)] | 6.20 | 9.20 | 9.60 | 4.40 |

TABLE 11

Product fractions, raw material 6A

| | xylose fraction | combined residue fraction |
|---|---|---|
| dry solids content (w-%) | 21.00 | 11.60 |
| xylose content (w-%)[1)] | 48.00 | 2.11 |
| xylonic acid content (w-%)[1)] | 16.80 | 2.01 |
| xylose yield (w-%) | 90 | |

TABLE 12

Product fractions, raw material 6B

|  | xylose fraction | combined residue fraction |
|---|---|---|
| dry solids content (w-%) | 21.00 | 11.60 |
| xylose content (w-%)[1] | 36.60 | 1.73 |
| xylonic acid content (w-%)[1] | 25.60 | 4.81 |
| xylose yield (w-%) | 85 |  |

TABLE 13

Product fractions, raw material 6C

|  | xylose fraction | combined residue fraction |
|---|---|---|
| dry solids content (w-%) | 21.20 | 12.80 |
| xylose content (w-%)[1] | 44.20 | 1.43 |
| xylonic acid content (w-%)[1] | 25.90 | 4.84 |
| xylose yield (w-%) | 90 |  |

TABLE 14

Product fractions, raw material 6D

|  | xylose fraction | combined residue fraction |
|---|---|---|
| dry solids content (w-%) | 21.00 | 11.60 |
| xylose content (w-%)[1] | 59.20 | 3.64 |
| xylonic acid content (w-%)[1] | 10.20 | 0.13 |
| xylose yield (w-%) | 92.3 |  |

Tables 10 to 14: [1]Contents from dry solids

The tables clearly show that a considerably higher xylose content and a low xylonic acid content are obtained for the separated xylose fraction from a cooking liquor with a higher xylose content and a lower xylonic acid content.

In accordance with the method of the present invention, production of xylose with a better yield than previously can be implemented by separating the xylose by chromatography from a sulphite cooking liquor obtained from sulphite cooking containing a small or reduced amount of base. In the examples illustrating the present invention, different hardwood species were used, the availability of which varies in different areas. Let it be pointed out that e.g. birch is a significant wood raw material in certain areas and can also be used as the raw material of xylose in accordance with the invention.

What is claimed is:

1. A method of producing xylose by chromatographic separation of the xylose from sulphite cooking liquors, derived from a xylan-containing biomass, wherein said sulphite cooking liquor has a base content less than about 1.0 mol/kg wood calculated from dry solids.

2. The method as claimed in claim 1, wherein the amount of base used in the cooking is reduced by lowering the base/wood ratio.

3. The method as claimed in claim 2, wherein said base/wood ratio is $Mg^{2+}$/wood ratio.

4. The method as claimed in claim 2, wherein said base/wood ratio is $Ca^{2+}$/wood ratio.

5. The method as claimed in claim 2, wherein the base/wood ratio is reduced and from the cooking liquor liberated $SO_2$ is recycled to cooking acid preparation.

6. The method as claimed in claim 1, wherein said sulphite cooking liquor has a low xylonic acid content.

7. The method as claimed in claim 6, wherein said xylonic acid content is less than 7% by weight, calculated from dry solids.

8. The method as claimed in claim 6, wherein said xylonic content is less than 5% by weight, calculated from dry solids.

9. The method of claim 1, wherein said sulphite cooking liquor has a xylose content of more than 10% by weight, calculated from dry solids.

10. The method as claimed in claim 9, wherein said sulphite cooking liquor has a xylose content of more than 15% by weight, calculated from dry solids.

11. The method as claimed in claim 9, wherein said sulphite cooking liquor has a xylose content of more than 20% by weight, calculated from dry solids.

12. The method as claimed in claim 1, wherein the ion form of the resin used in the chromatographic separation is equilibrated to substantially the same form as the base used in the sulphite cooking.

13. The method as claimed in claim 1, wherein $Mg^{2+}$, $Ca^{2+}$, $Na^+$ or $NH_4^+$ is used as the base in the sulphite cooking.

14. The method as claimed in claim 13, wherein $Mg^{2+}$ or $Ca^{2+}$ is used as the base in the sulphite cooking.

15. A method as claimed in claim 12, wherein a $Ca^{2+}$ or $Mg^{2+}$ form is used as the ion form of the resin.

16. The method as claimed in claim 12, wherein said resin used in the chromatographic separation is a strongly acid cation exchange resin.

17. The method as claimed in claim 16, wherein said strongly acid cation exchange resin is a resin with a polystyrene/divinyl benzene backbone.

18. The method as claimed in claim 1, wherein said chromatographic separation is carried out by a batch method.

19. The method as claimed in claim 1, wherein said chromatographic separation is carried out by a simulated moving bed method.

20. The method as claimed in claim 1, wherein water is used as an eluent in the chromatographic separation.

21. The method as claimed in claim 1, wherein said cooking liquor is obtained from acid sulphite cooking.

22. The method as claimed in claim 1, wherein xylan-containing biomass used in the sulphite cooking is selected from the group consisting of hardwood, birch, beech, aspen, eucalyptus, straw and bagasse.

23. The method as claimed in claim 1, wherein a xylose fraction is recovered.

24. The method as claimed in claim 23, wherein said xylose fraction is recovered by crystallization.

25. A method of producing xylose from xylan-containing biomass, by (1) sulphite cooking the xylan-containing biomass in the presence of base to produce a sulphite cooking liquor containing xylose and xylonic acid; and (2) subjecting said sulphite cooking liquor to a chromatographic separation to produce a xylose enriched fraction; wherein the amount of base used in step (1) is less than about 1.0 mol/kg wood, calculated from dry solids.

* * * * *